United States Patent [19]

Schön et al.

[11] Patent Number: 5,168,597
[45] Date of Patent: Dec. 8, 1992

[54] CONNECTOR FOR FASTENING A WINDSHIELD WIPER BLADE TO A WINDSHIELD WIPER ARM

[75] Inventors: Wilfried Schön, Saint-Etienne; Pascal André, Clermont-Ferrand, both of France

[73] Assignee: Valeo Systems d'Essuyage, Montigny-le-Bretonneux, France

[21] Appl. No.: 670,931

[22] Filed: Mar. 18, 1991

[30] Foreign Application Priority Data

Mar. 19, 1990 [FR] France .............................. 90 03474

[51] Int. Cl.$^5$ ............................................. B60S 1/40
[52] U.S. Cl. ....................................................... 15/250.32
[58] Field of Search ........... 15/250.31, 250.32, 250.33, 15/250.34, 250.35, 250.36, 250.42

[56] References Cited

U.S. PATENT DOCUMENTS

| | | | |
|---|---|---|---|
| 4,023,232 | 5/1977 | Smithers | 15/250.32 |
| 4,179,766 | 12/1979 | Weiler et al. | 15/250.32 |
| 4,179,767 | 12/1979 | Weiler et al. | 15/250.32 |
| 4,290,164 | 9/1981 | von der Berg | 15/250.32 |
| 4,598,438 | 7/1986 | Egner-Wolter et al. | 15/250.32 |
| 4,967,548 | 11/1990 | Arai et al. | 15/250.32 |

FOREIGN PATENT DOCUMENTS

| | | | |
|---|---|---|---|
| 0002843 | 7/1979 | European Pat. Off. . | |
| 0158071 | 10/1985 | European Pat. Off. | 15/250.32 |
| 0290324 | 11/1988 | European Pat. Off. . | |
| 2624953 | 12/1977 | Fed. Rep. of Germany | 15/250.32 |
| 3619589 | 12/1987 | Fed. Rep. of Germany . | |
| 8607351 | 3/1988 | Fed. Rep. of Germany . | |
| 3914629 | 11/1989 | Fed. Rep. of Germany . | |
| 0077582 | 2/1962 | France | 15/250.32 |
| 2403247 | 4/1979 | France . | |
| 2468490 | 5/1981 | France . | |
| 2631300 | 11/1989 | France | 15/250.32 |
| 2041729 | 9/1980 | United Kingdom | 15/250.32 |

Primary Examiner—Harvey C. Hornsby
Assistant Examiner—Gary K. Graham
Attorney, Agent, or Firm—Dennison, Meserole, Pollack & Scheiner

[57] ABSTRACT

A generally U-shaped connector, having two branches, for fastening together a windshield wiper arm and a windshield wiper blade, has a latching means cooperating with a recess formed in the wiper arm. The connector also includes gripping means for unlocking the arm from the blade. At least one of the branches of the connector body includes at least two resiliently deformable tongues, which are separated from each other by gaps. One of these tongues carries the latching means, while the other tongues, working as a pair, carry the gripping means.

6 Claims, 2 Drawing Sheets

5,168,597

CONNECTOR FOR FASTENING A WINDSHIELD WIPER BLADE TO A WINDSHIELD WIPER ARM

FIELD OF THE INVENTION

This invention relates to a connector for fastening a windshield wiper blade and a windshield wiper arm together, in particular in an automotive vehicle.

BACKGROUND OF THE INVENTION

In the prior art, such connectors conventionally include means whereby an axis or fastening element such as a pin, carried by the windshield wiper blade, are received in the connector itself, which also usually includes means for latching the connector to the windshield wiper arm. In the particular case in which the arm has a bent-over or curved end, usually in the form of a hook, the wiper blade has an opening through which this curved end can be inserted, with the transverse fastening element being arranged to extend across this opening so that the arm and the blade are articulated together. The connector has a longitudinal profile which is substantially U-shaped, defining two branches and adapted to fit within the hollow of the hooked end portion of the arm. Such a connector includes both a latching means for latching the connector on to the arm, and the above mentioned means for receiving the fastening element or pin, with these receiving means being open on the side opposite to the base of the U and being so arranged as to enable the pin to be introduced and then retained.

The latching means are carried by one of the branches of the U-shaped connector, and may for example comprise a projecting lug which cooperates with a recess provided on the hooked end of the arm and facing towards this lug.

In order to permit any action to be carried out on the blade, for example when it requires to be replaced, U. S. Pat. No. 4,179,767 for example discloses gripping means which enable the arm and the blade to be separated from each other. These gripping means are arranged at the end of the branch of the U-shaped connector which carries the latching means, so as to project in such a way that it is possible to release the lug manually from its associated recess which is provided on the hooked end of the arm, by deformation of the branch towards the other branch.

A drawback of this arrangement is that it is necessary to form the branch with a transverse section, carrying the latching means together with the gripping means, such as to give the branch an elasticity which will, of necessity, have to be a compromise between the different degrees of elasticity called for by three conflicting requirements. These are firstly the engagement, retention and release of the lug from within the recess in the arm; secondly the need to avoid too large a manual force having to be exerted on the gripping means in order to unlock the arm and the blade from each other; and thirdly the need to prevent the gripping means from being accidentally acted on so as to dislodge the blade. The resulting compromise inevitably results in the gripping means being somewhat hard to operate, since the prime requirement that must be satisfied is that the elasticity has to be correct for the latching means itself.

DISCUSSION OF THE INVENTION

The disadvantages discussed above are mitigated by the present invention, which provides a connector which is of very simple design and which is very easy to operate.

In accordance with the invention, there is provided a connector for fastening a windshield wiper blade to a windshield wiper arm, in particular for an automotive vehicle, wherein the connector has a generally U-shaped cross sectional profile defining two branches, with at least one of the said branches including latching means for latching the connector on to the arm, together with gripping means; the connector is characterised in that at least one of the said branches comprises at least two resiliently deformable elements separated from each other, one of the said resiliently deformable elements carrying the gripping means and the other said resiliently deformable element carrying the latching means.

Using a connector according to the invention, the resilient element which carries the latching means is able to be made with a reduced cross section, so increasing its elasticity, and of reduced width, so that the manual force which it is necessary to apply for unlocking purposes is applied directly on the other resilient element of the branch and can be of any desired magnitude.

Further features and advantages of the invention will appear more clearly from the description which follows, which is given by way of example only and with reference to the accompanying drawings.

DESCRIPTION OF PREFERRED EMBODIMENTS OF THE INVENTION

Figure 4:
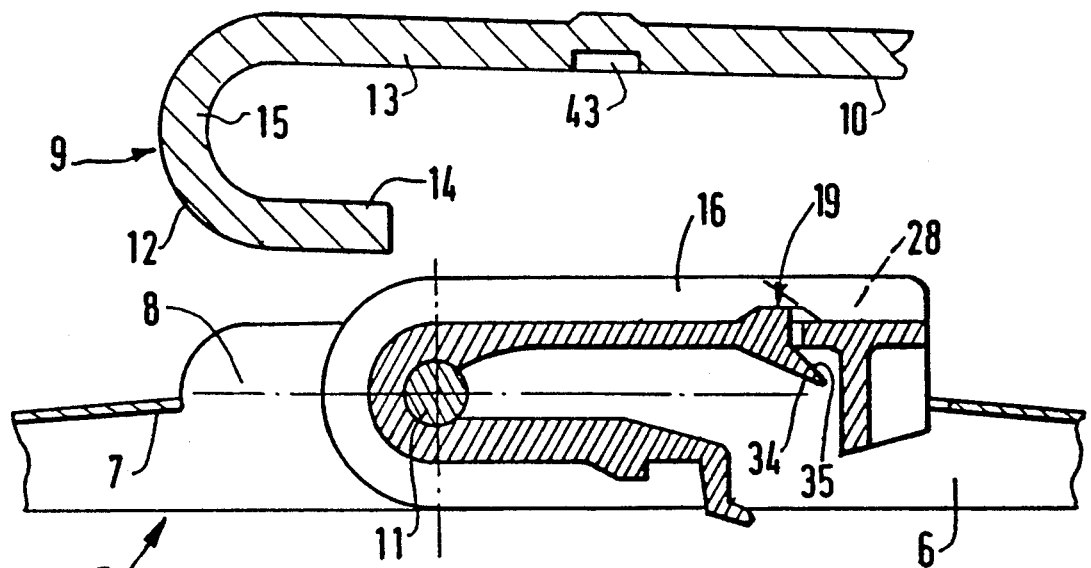
FIG. 4 is a view in longitudinal cross section showing the connector in accordance with the present invention adapted to fasten a windshield wiper arm and a windshield wiper blade together.

Referring first to FIGS. 1 to 4, these show a connector 2 having a longitudinal profile which is substantially U-shaped, having two branches 3 and 4. This connector is adapted to be carried by a windshield wiper blade 5 (FIG. 4). The main mounting member 6 of the wiper blade 5 has a transverse cross section with an inverted U-shaped profile and is adapted to carry, either directly or through conventional yoke members (not shown), a windshield wiper wiping strip of flexible material (which is also not shown) for wiping against the surface that is to be swept.

More precisely, the main mounting member 6 is formed with an opening 8 in its base wall 7. The opening 8 is provided for the purpose of receiving both the connector 2 and the end portion 9 of a windshield wiper arm 10. A transverse fastening pin 11 extends across the opening 8, for fastening the arm 10 and the windshield wiper blade 5 together in an articulated manner.

The end portion 9 of the arm 10 is, in this example, so shaped as to have a hook-shaped curved portion 12. The connector 2 is arranged to fit within the interior or concavity of the curved portion 12 in such a way that the branches 3 and 4 of the connector 2 bear respectively on the two side portions 13 and 14 of the hooked portion 12. The side portion 13 is an extension of the main body of the windshield wiper arm, while the side portion 14 is arranged substantially parallel to the portion 13, to which it is joined by means of a curved portion which is complementary in shape to the curved portion of the connector 2 that joins the branches 3 and 4 of the latter together.

Still referring to FIGS. 1 to 4, the connector 2 has an edge portion 16 on each side, in the form of a rib which is substantially orthogonal to the plane in which the branches 3 and 4 of the connector lie. These ribs are arranged to flank the end portion 9 of the windshield wiper arm 10.

The connector 2 also includes means for receiving the fastening pin 11 of the windshield wiper blade 5. This pin receiving means consists of a recess 17 having a circular transverse cross section, disposed close to the U-shaped curved portion of the connector 2 and defining an opening 18 which is open in the same direction as the U. Preferably, the diameter of the recess 17 is equal to that of the fastening pin 11, though the dimension of the opening 18 is less than that diameter. Thus, introduction of the fastening pin 11 into the recess 17 is obtained by resilient deformation of the connector 2, and when the connector recloses after such deformation, the fastening pin 11 is then firmly clipped within the recess 17.

The connector 2 includes, on the same branch (which is preferably the upper or main branch 3), a latching means 19 for engaging the arm 10, together with gripping means 20 which assist unlocking of the connector 2 from the windshield wiper arm 10.

In practice, the branch 3 is formed with three resilient tongues 21, 22 and 23, which extend along the branch 3 parallel to each other, approximately from the middle plane XX' of the branch. The tongues 21 to 23 are separated from each other by apertures 24 and 25 which also extend along the branch and which are also parallel to each other. The tongues 21 and 23 lie on either side of the tongue 22, and are joined to each other through a transverse portion 26, which extends at right angles to the three tongues and which is situated at the free end of the branch 3. The transverse portion 26 is so arranged as to leave an aperture 27, which extends at right angles to the apertures 24 and 25 so as to form with them a generally U-shaped opening, with the base of the U of this opening nearest to the free end of the branch 3.

The tongues 21 and 23 carry the gripping means 20, which in this example are in their preferred form, namely that of lugs 28 projecting outwardly from the sides of the branch 3. More precisely, the gripping lugs 28 are carried by the outer surfaces of the ribs 16, which are also the outer surfaces of the tongues 21 and 23. Also, as is preferred, the lugs 28 are arranged on either side of the transverse portion 26, so as to obtain good flexibility from the tongues during the unlocking operation which will be explained in more detail below.

The latching means 19 is carried by the central tongue 22, and comprises at least one lug 29 which projects from the tongue 22, in this example in a direction away from the U-shaped opening of the connector 2. The width of the lug 29 is substantially the same as that of the central tongue 22. The lug 29 is disposed close to the free end 30 of the central tongue 22, and has a gently sloping surface 31 on the opposite side of the lug from the free end 30. The sloping surface 31 is continued in a surface 32, spaced above the outer surface of the tongue 22 but parallel to the latter, and terminating at an abrupt end surface 33 which is substantially orthogonal to the longitudinal direction of the central tongue 22.

The free end 30 of the tongue 22 is continued in an actuating means 34 for this tongue, which in the remainder of this description will be referred to as a catch. The catch 34 comprises a projection which forms an extension of the free end of the central tongue 22, being directed both downwardly, in FIG. 1, towards the U-shaped opening of the connector 2, and to the right in FIG. 1, i.e. generally towards the transverse portion 26, so as to lie partly below the latter.

Figure 1:
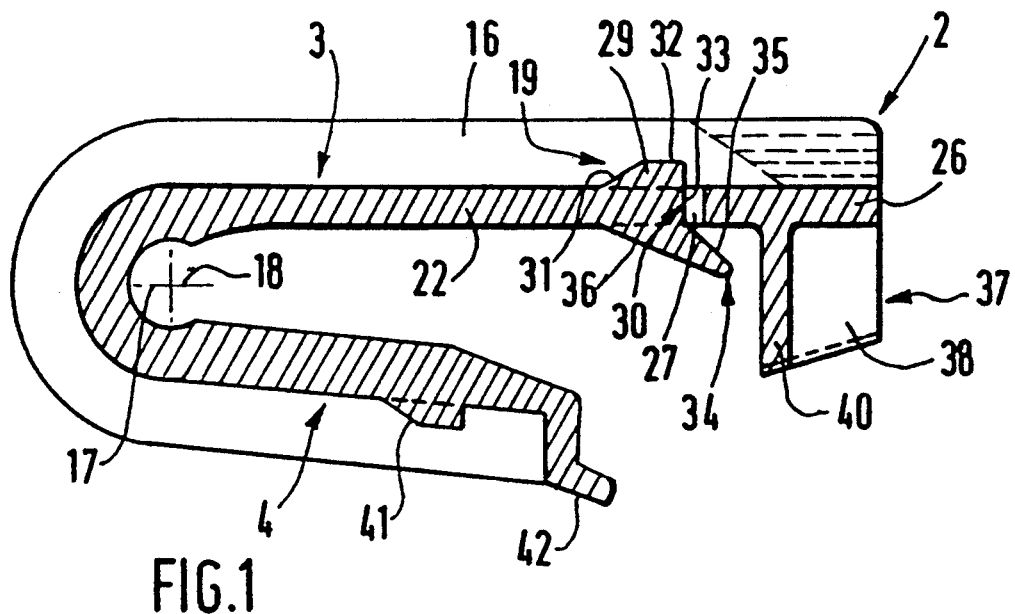
FIG. 1 is a view in longitudinal cross section of the connector in accordance with the invention, taken on the line 1—1 in FIG. 2.
Figure 2:
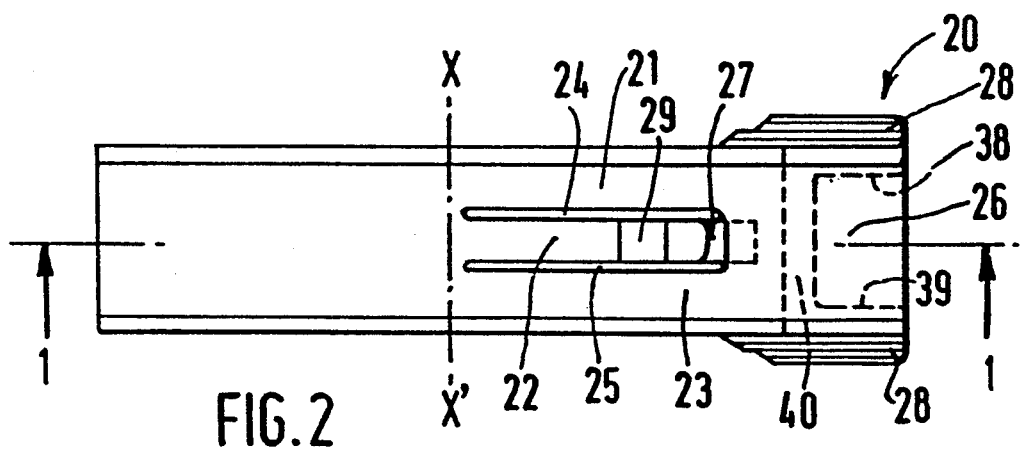
FIG. 2 is a top plan view on FIG. 1.
Figure 3:
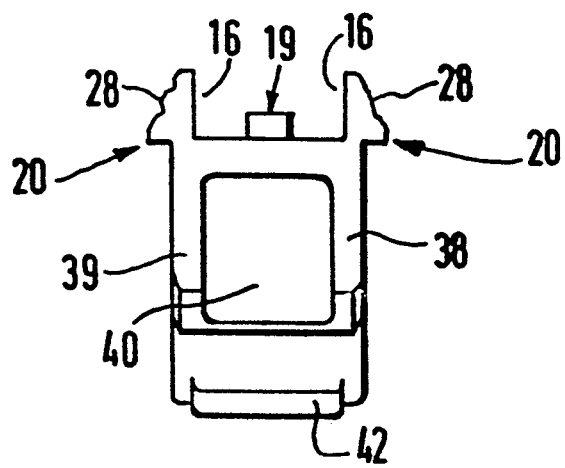
FIG. 3 is a view from the right hand side of FIG. 1.

As is best seen in FIG. 1, the catch 34 has a first inclined surface 35 which extends over the whole width of the central tongue 22 and which extends from the lower edge of the abrupt surface 33 of the lug 29, so that the inclined surface 35 lies below the transverse portion 26 but facing the latter. The catch 34 has a second inclined surface 36 which joins the free end of the first inclined surface 35 to the inner surface of the central tongue 22, i.e. the surface which faces into the U-shaped opening of the connector 2.

Preferably, and as shown, the transverse portion 26 of the connector 2 has stiffening means 37 extending from its inner surface directed towards the U-shaped opening of the connector. The stiffening means 37 consists of two parallel walls 38 and 39, together with a base wall 40 joining the walls 38 and 39 together so as to give the stiffening means 37 a U-shaped profile. The stiffening walls 38, 39 and 40 stand at right angles to the inner surface of the branch 3, with the walls 38 and 39 extending in the same direction and in the same plane as the ribs 16, but from the surface opposite to that which carries the ribs 16, while the free ends of these walls extend towards the free end of the branch 3. The base wall 40 extends at right angles to the inner surface of the transverse portion 26, and is spaced back from the free end of the branch 3.

In a modification, the latching means 19 and the gripping means 20 may of course be carried by the branch 4, or indeed by both of the branches 3 and 4. In addition, and as shown in the drawings, the latching means and gripping means known from the prior art may also be provided, these being carried by the branch 4 and comprising a second lug 41 and an unlocking tail 42 projecting from the branch 4. These elements will not be described here in any greater detail.

The operation of fastening the windshield wiper arm 10 and the windshield wiper blade 5 together will now be described with reference to FIGS. 4 and 5. In a first step, the connector 2 is mounted on the blade 5 as discussed above, in particular by engaging the fastening pin 11 between the inner faces of the branches 3 and 4 of the connector, and by then exerting a pushing force sufficient to cause the branches to deform resiliently, so that the fastening pin 11 then lies inside the recess 17 of the connector. When the pivot pin 11 has been thus positioned, the connector 2 reverts to its initial shape and the pin 11 is retained in the recess 17.

Fitting of the unit which now consists of the blade 5 carrying the connector 2 is now carried out by passing this unit under the arm 10, in such a way that the connector 2 lies behind the curved portion 12 of the arm. The latter is then introduced into the opening 8 of the blade 5, and the blade is pushed in such a way as to engage the connector 2 in translational movement in the concavity of the curved portion 12, until the lug 29 on the central tongue 22 is first deflected downwardly, i.e. towards the U-shaped opening of the connector 2, by flexing of the central tongue 22. The outer tongues 21 and 23 are subjected to only the minimum amount of flexing necessary to allow the end portion 9 to engage with its inner face on the branch 3. The pushing movement is continued until the lug 29 comes into cooperation with a recess 43 which is provided on the inner surface of the arm 10, whereupon the tongue 22 reverts to approximately its initial state. The recess 43 may be in the form of a through hole or a blind recess.

The longitudinal positions of the lug 29 and recess 43 are so chosen that these two elements are able to cooperate with each other when the convex base of the connector 2 comes into cooperation with the concave base of the curved portion 12 of the arm.

Figure 5:
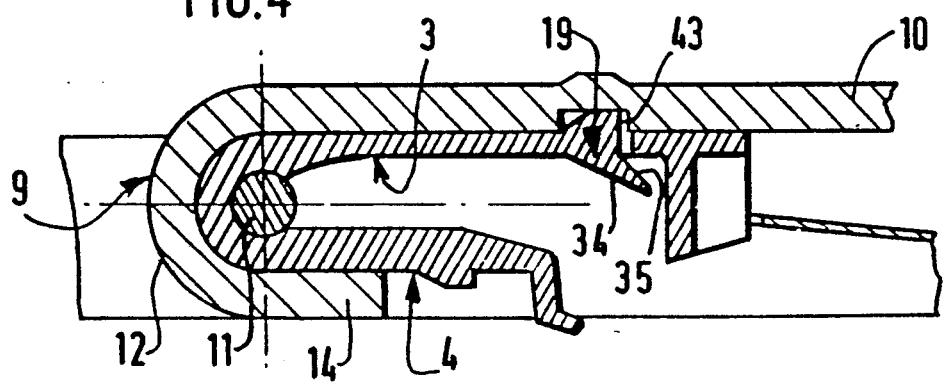
FIG. 5 is a view in longitudinal cross section showing the components of FIG. 4 assembled together.

In the assembled condition shown in FIG. 5, the arm 10 is prevented from performing any translational movement with respect to the connector 2 due to the contact between the abrupt surface 33 of the lug 29 and one of the walls of the recess 43, and also by cooperation of the concave profile of the arm end portion 12 with the convex profile of the connector 2.

Dismounting the connector 2 from the arm 10 is easily carried out by manually gripping the lugs 28, which causes the tongues 21 and 23 to bend towards the U-shaped opening of the connector, until the transverse edge of the transverse portion 26, facing the inclined surface 35 of the catch 34, comes in contact with the latter. When the manual action is continued, the catch 34 causes the resilient tongue 22 to move in the same direction until the lug 29 is disengaged from the recess 43 in the arm 10. The wiper blade 5 is then simply pulled from left to right (with reference to FIG. 5) so as to separate the arm and the blade from each other, with the blade still carrying the connector 2.

This dismounting operation is especially facilitated since the lugs 28 lie on either side of the arm 10, being situated away from the swept surface (i.e. the windshield) of the vehicle and away from any obstacle which might prevent the blade and arm from being separated from each other without the arm having to be lifted by a large amount.

In addition, it is not necessary to exert a large force on the lugs 28 in order to unlock the assembly, due to the fact that the resilient side tongues 21 and 23, carrying the gripping means 20, have a high elasticity because of their reduced cross section, while having on the other hand high mechanical strength due to the fact that there are two side tongues. In addition, if a high force should by chance be exerted, the central tongue 22 will not be damaged because the side tongues 21 and 23 absorb most of the force.

In a preferred arrangement, the transverse cross sections of the side tongues 21 and 23 on the one hand, and that of the central tongue 22 on the other hand, are such that the side tongues 21 and 23 are sufficiently elastic to remove any need for a high manoeuvring force, while the central tongue 22 has an elasticity which is suited for the fitting operation and for holding the lug 29 in place and enabling the latter to be released.

In addition, if any accidental force acts on the gripping means 20, the latter can only cause the actuating means, i.e. the catch 34, to operate after some dead movement has taken place between the transverse free edge of the transverse portion 26 and the inclined surface 35, which as can be seen in FIG. 5 is spaced away from that transverse edge.

Figure 6:
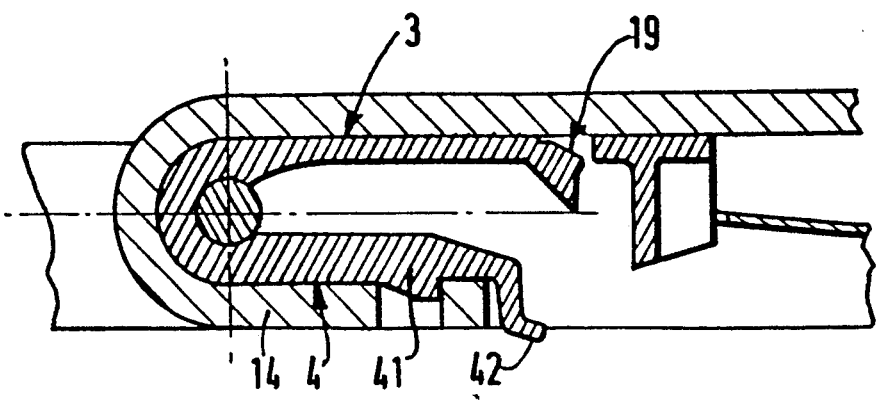
FIG. 6 is a view in longitudinal cross section showing the use of the connector in accordance with the invention in another mounting arrangement.

In the modification shown in FIG. 6, the connector 2 includes on its branch 4 a second latching means and a second gripping means, which may be identical with the latching means 19 and gripping means 20 described above, but which here comprise the elements 41 and 42 already mentioned and known from the prior art. These second latching means and gripping means are necessary if the connector is to be adapted for the fitting of any kind of windshield wiper arm having a curved or hooked end portion, and which is of the kind which has a locking recess either directly on the arm itself or on the terminal or bent-back side portion 14 of the latter.

The connector in accordance with the invention enables the locking means 19 to be rendered inoperative where a second locking means is provided, such as the lug 41 mentioned above, which cooperates with a recess provided in the side portion 14. In this case, the lug 29 can readily be deflected towards the U-shaped opening of the connector 2 because of the high elasticity of the central tongue 22, without causing the whole of the branch 3 to deform.

The present invention is not limited to the particular embodiments described above, but embraces all possible variants. In particular, the latching means provided on the central tongue 22 may comprise a recess or aperture, with the arm 10 itself carrying a cooperating lug, instead of the recess 43 shown in the drawings.

In another modification, within the scope of the invention, the connector may be used for fastening a windshield wiper blade to an arm having a straight end instead of a hooked end, and in that case the latching means 19 and the gripping means 20 will be disposed towards the U-shaped opening of the connector.

What is claimed is:

1. A connector for fastening a windshield wiper blade to a windshield wiper arm, comprising a generally U-shaped body defining two branches, with at least one said branch including latching means for latching the connector to said wiper arm, and gripping means, said at least one said branch comprising first, second and third resiliently deformable tongues spaced apart transversely from each other and parallel to each other with said second tongue being flanked by said first and third tongues, wherein said second tongue carries said latching means and said first and third tongues carry said gripping means which are manually operable to actuate said latching means to unlatch said connector from said wiping arm.

2. A connector according to claim 1 further comprising a transverse portion joining said first and third tongues together, said transverse portion being movable by said gripping means to actuate said latching means.

3. A connector according to claim 2, wherein the gripping means comprise lugs projecting transversely outwardly from the associated said branch.

4. A connector according to claim 2, wherein the latching means comprise a lug projecting from said second tongue.

5. A connector as claimed in claim 2 wherein said second tongue has a free end, said latching means including actuating means projecting from said free end, said actuating means being operable by said transverse portion.

6. A connector according to claim 5, wherein the actuating means lies partly below the transverse portion.

* * * * *